United States Patent
Khosla (12)

(10) Patent No.: US 6,718,259 B1
(45) Date of Patent: Apr. 6, 2004

(54) ADAPTIVE KALMAN FILTER METHOD FOR ACCURATE ESTIMATION OF FORWARD PATH GEOMETRY OF AN AUTOMOBILE

(75) Inventor: Deepak Khosla, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 10/263,924

(22) Filed: Oct. 2, 2002

(51) Int. Cl.[7] .............................................. G01C 21/26
(52) U.S. Cl. ........................ 701/200; 701/96; 701/210; 340/435
(58) Field of Search ................................. 701/300, 301, 701/200, 205, 207, 210, 211, 216, 96; 340/435, 903; 342/457

(56) References Cited

U.S. PATENT DOCUMENTS 6,265,991 B1 * 7/2001 Nishiwaki et al. .......... 340/903

* cited by examiner

Primary Examiner—Tan Q. Nguyen
(74) Attorney, Agent, or Firm—Tope - McKay & Associates

(57) ABSTRACT

The present invention provides a method and apparatus for estimation of vehicle forward path geometry utilizing an adaptive Kalman filter bank and a two-clothoid road model. The invention provides that each of a plurality of Kalman filters, utilizing the latest available measurement vector $Y_k$ at time k, estimates the state vector $X_k$ and error covariance matrix $P_k$. The outputs of filter 504a, 504b, and 504c denoted as as $X_k^j$ and $P_k^j$, are provided to a plurality of weighting elements, which calculate weight factors, $W_k^j$ 506a, 506b, and 506c for each filter. The weight factor of each filter is the probability that the upcoming road geometry matches the road model hypothesized in the filter. After being assigned a weighted value, the weighted value road models are fused in a fusion element 508, and a weighted output road geometry model is provided.

57 Claims, 7 Drawing Sheets

ADAPTIVE KALMAN FILTER METHOD FOR ACCURATE ESTIMATION OF FORWARD PATH GEOMETRY OF AN AUTOMOBILE

TECHNICAL FIELD

The present invention is generally related to vehicular forward path geometry estimation, and more specifically to a method and apparatus for accurate estimation of vehicle forward path geometry utilizing an adaptive Kalman filter bank and a two-clothoid road model.

BACKGROUND OF THE INVENTION

Vehicular land and road detection systems have been the subject of significant research. Applications such as adaptive cruise control, collision avoidance systems, and vehicle guidance systems require knowledge of the geometry of the road to be most effective. It is difficult for a collision avoidance system to accurately characterize a stationary or slower moving object as non-hazardous unless there is some certainty that the stationary object is not in the vehicle's path. Previous approaches to estimation of forward road geometry model the road in the forward view as either a constant curvature or a linearly varying curvature. These road geometry estimation approaches then fit parameters of these models via a least-squares fitting technique or other mathematical technique. The linearly-varying curvature model is usually referred to as a single-clothoid model and is completely described by two coefficients: $c_0$, the local curvature at host vehicle position, and $c_1$, the rate of change of curvature with distance. Both the constant curvature and single-clothoid road models do not adequately represent road geometry, especially when there are abrupt changes in curvature in the look-ahead range. Such sharp changes in curvature are common on many roads and freeways, particularly where a straightaway section abruptly transitions to a curved section and vice-versa. Thus, methods based on these simple models are generally inadequate in describing forward road geometry.

To overcome the problem of inaccurate road geometry estimation with these simple models, an averaged curvature road model has been proposed. This approach works well on roads with low curvature and very smooth curvature changes, but still fails on roads with significant curvature changes or discontinuities in $c_1$. To reduce these errors further, more complex road models were proposed that split the road into multiple clothoid segments. The transition between segments is estimated using ad-hoc methods such as the generalized likelihood ratio test. In this approach, the geometry of the segments is not dynamic, and is updated using measurements that fall in the corresponding segment. A dynamic model is required for vehicle dynamics only, as the road model remains spatially fixed, while the vehicle is moving through the road segments. One of the fundamental limitations of this approach is that road geometry estimation accuracy is strongly dependent on reliable detection of transition points between segments making it very sensitive to noise in the measurements. Thus they are often inaccurate in moderate and high noise measurement conditions. In addition, the segmentation process is computationally expensive because the likelihood ratio test has to be performed for each new measurement.

A naïve approach of using a road model based on a higher-order polynomial to solve these problems with previous methods will lead to over-fitting road geometry and a statistically insignificant estimate of the coefficient of this higher order term. This will also make this approach more sensitive to noise. Thus, it would be desirable to develop a model that overcomes the problems associated with previous approaches. Ideally such a model would be simple to implement and would not be as computationally intensive or ad-hoc as the previous multi-clothoid models.

Previous approaches use a conventional Kalman filter with fixed process model parameters that are chosen to provide a compromise between noise and filter lag. In other words, process noise parameters in the conventional filters is chosen so that the filter lag (time taken by filter to catch up with new geometry) is reduced during transitions in road geometry at the expense of introducing some noise during slowly changing road geometry conditions. Thus, the filter performance is moderate during all road geometry conditions. However, the estimation errors may still be unacceptably large for systems that rely on the forward geometry information.

The single-clothoid road model could result in large estimation errors on roads with transitions in curvature rate parameter $c_1$ in the look-ahead range. To overcome the problem of suddenly changing $c_1$ parameters, artisans have used an averaged curvature model. This approach is suitable on some ideal roads with low curvature and very smooth curvature changes, but performs poorly on roads with significant jumps in $c_1$. To reduce these errors, the road model was split into a number of segments and each segment was modeled as a clothoid. However, this solution assumes that clothoid coefficients $c_0$ and $c_1$ are constant instead of being time-dependent. As a consequence, measurements only improve the accuracy of estimation of segment parameters, but do not drive a dynamic system of the road course. This approach requires accurate estimation of the transition between road segments. Artisans have estimated transition points by applying spatially recursive estimation and the generalized likelihood ratio method. One of the fundamental limitations of this approach is that road geometry estimation accuracy is strongly dependent on reliable detection of transition points which is a very difficult estimation problem. In addition, the segmentation process is computationally expensive because the likelihood ratio test has to be performed for each new measurement. It would thus be desirable to provide a geometry estimation scheme that is not strongly dependent on reliable detection of transition points and is not computationally expensive. It would also be desirable to avoid the need to use compromised, static process model parameters.

SUMMARY OF THE INVENTION

The present invention provides an apparatus for dynamically predicting road geometry. The apparatus comprises a bank of filters configured to receive current environmental data from at least one sensor. After receiving the data, the bank of filters performs an estimation using the data, resulting in filter output from each filter. A weighting element is configured to receive the filter output from the bank of filters, and to ascribe a weighted value to each filter output based on a relevance of the filter. The weighting element thereby provides weighted outputs.

The apparatus further comprises a fusing element configured to fuse the weighted outputs into a single output; whereby the output describes a vehicle forward path estimate.

In another aspect, the bank of filters of the apparatus is further configured to receive a previous vehicle path estimate and to recursively perform the estimation based on the current environmental data and the previous vehicle path estimate. In a still further aspect, each filter in the bank of filters is a Kalman filter. In yet another aspect, the bank of filters includes three Kalman filters.

In a further aspect, the configuration of the bank of filters is based on a polynomial road model, which in a still further aspect is a two-clothoid road model. In this case, each filter may be tuned to a different class of geometry within the two-clothoid road model. In a more specific aspect, the different classes of geometry include a constant geometry road section, an upcoming transition in the far range, and an upcoming transition in the near range.

In yet another aspect, the weighting element ascribes weighted values based on the posterior probabilities of a fit between the filter and the forward vehicle path estimate.

In a further aspect, the sensor is a device selected from a group consisting of imaging devices, GPS/map systems, laser sensors, and radars.

In another aspect, the output of the apparatus is configured for use by other automotive systems selected from a group consisting of driver assistance systems and vehicle safety systems.

Each of the operations of the apparatus discussed above typically corresponds to a software module for performing the function on a computer. In other embodiments, the means or modules may be incorporated onto a computer readable medium to provide a computer program product. Also, the means discussed above also correspond to steps in a method for estimating a vehicle forward path.

BRIEF DESCRIPTION OF THE DRAWINGS

The objects, features, and advantages of the present invention will be apparent from the following detailed description of the preferred aspect of the invention with references to the following drawings, where.

DETAILED DESCRIPTION

The present invention is generally related to forward path geometry estimation and more specifically to a method and apparatus for accurate estimation of forward path geometry of a vehicle, based on a bank of Kalman filters configured to adaptively respond to changes in road geometry and consistently identify which road model the existing path represents. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein. For instance, although only three road models and three Kalman filters have been described, it is considered to be within the scope of the invention to incorporate additional road models and filters. Furthermore, it should be noted that unless explicitly stated otherwise, the figures included herein are illustrated diagrammatically and without any specific scale, as they are provided as qualitative illustrations of the concept of the present invention.

Figure 1:
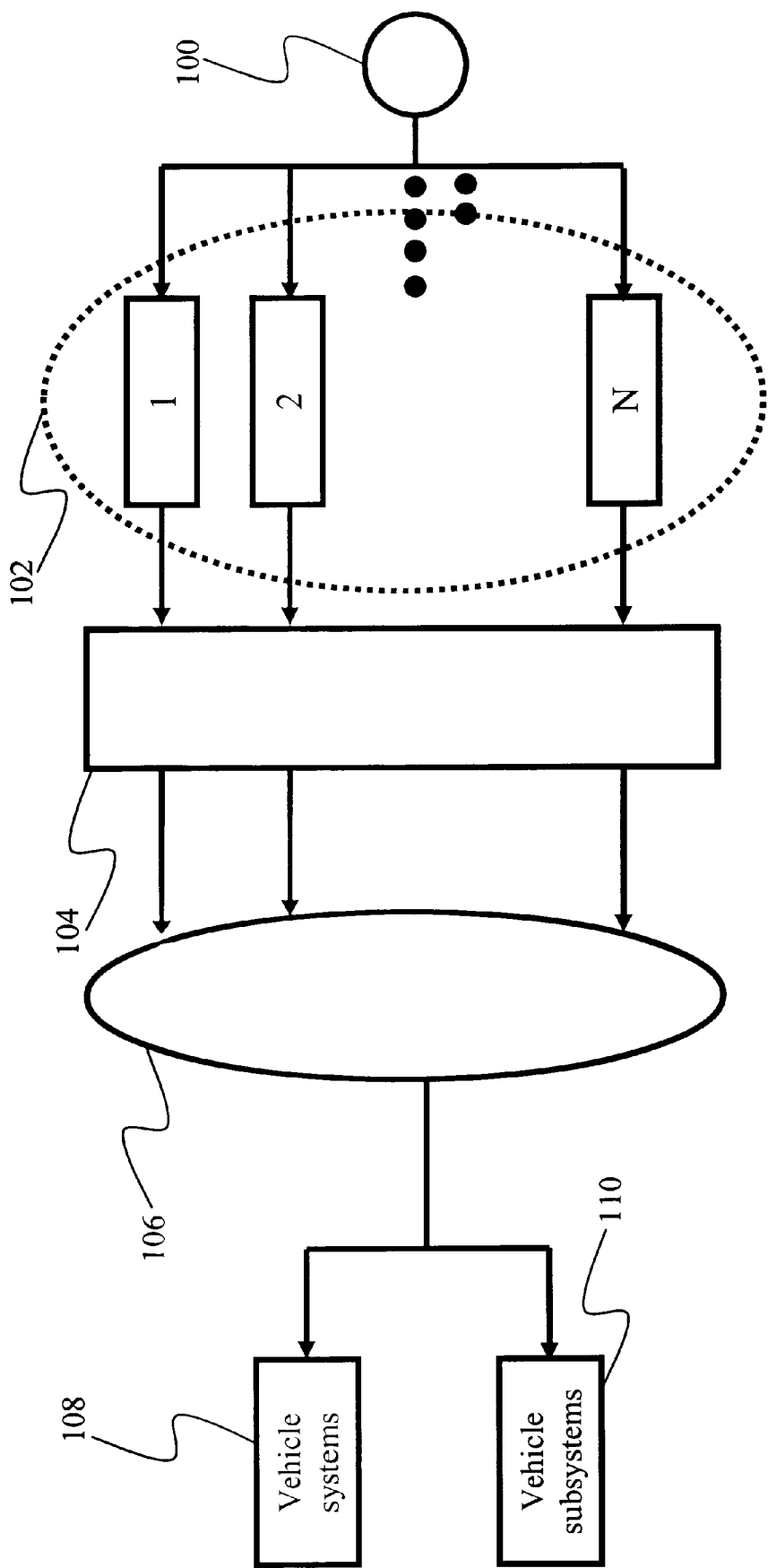
FIG. 1 is a block diagram depicting an aspect of the present invention.

One aspect of the present invention provides an apparatus for dynamically predicting road geometry. The apparatus is shown in FIG. 1 and includes at least one sensor 100, which is configured to collect environmental data and provide the data to a bank of filters 102. The filters 102, in a preferred aspect are Kalman filters. The filters 102 are configured to recursively estimate the road geometry according to a plurality of road models, and provide the estimated geometries to a weighting element 104. The weighting element 104, in turn, ascribes a weight to the output of each filter and provides the weighted values to a fusion element 106 which fuses the weighted values and provides a single road geometry prediction based on the weighted filter outputs. This prediction output has application in many vehicle systems 108 and vehicle subsystems 110 such as: autonomous vehicles, adaptive cruise control, and automotive collision warning systems.

Figure 2:
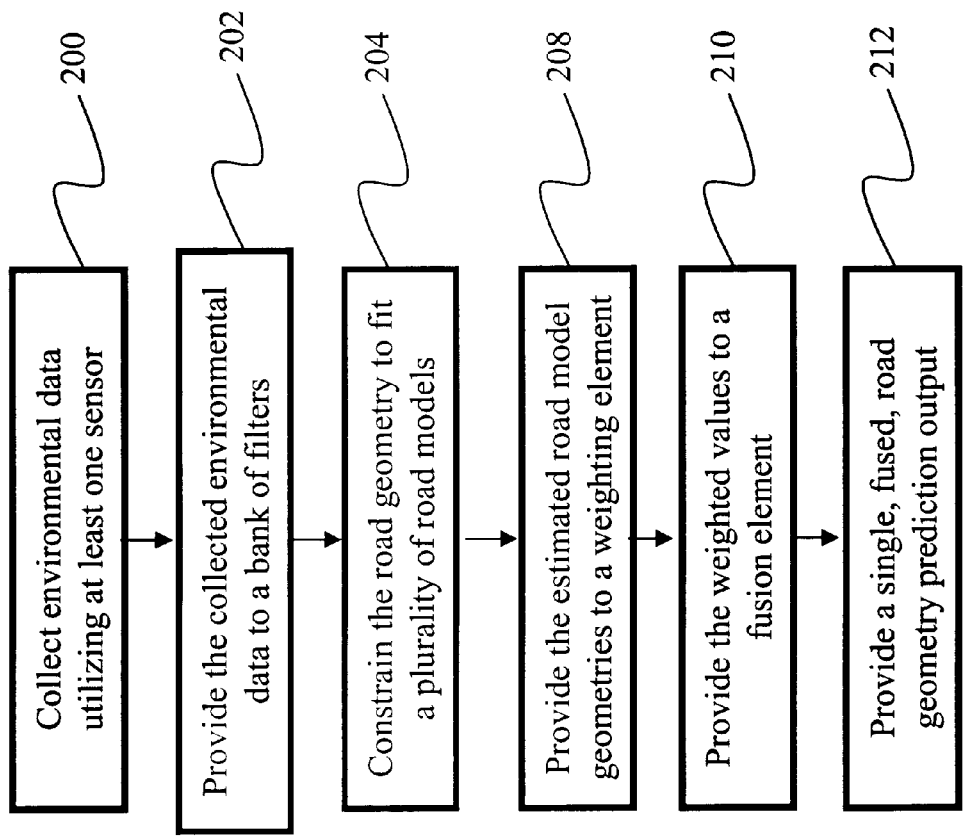
FIG. 2 is a flow chart depicting a method according to the present invention for predicting the geometry of the road in front of a host vehicle.

Another aspect of the present invention, shown in FIG. 2, provides a method for dynamically predicting road geometry comprised of the following steps: The first is collecting environmental data utilizing at least one sensor 200. The sensor may include a GPS/MAP combination or video footage, or a combination of both. The second step is to provide the collected environmental data to a bank of filters 202. In one aspect the bank of filters is comprised of Kalman filters. In the third step the road geometry is recursively estimated utilizing environmental data provided by the sensors or sensors and is constrained to fit a plurality of road models 204. Fourth, the estimated road model geometries are provided to a weighting element, which ascribes a weight value to the output of each filter 208. In the fifth step the weighted values are provided to a fusion element, which fuses the weighted values 210; and finally provides a single, fused, road geometry prediction output 212. This method provides for improved accuracy in estimating forward road geometry with stable estimates during constant geometry scenarios and better tracking during abrupt geometry transitions.

Another aspect of the invention adaptively tunes process model parameters such that the filter responds to road geometry changes quickly during sharp changes and provides stable and low noise estimates otherwise. This increased accuracy in road geometry estimation translates to improved detection of targets in the host vehicle's forward path and improves systems using this information, such as autonomous vehicles, adaptive cruise control and automotive collision warning systems.

The present invention finds application in automotive applications such as adaptive cruise control and collision warning applications. Additionally, the invention finds application in the enhancement of a variety of vehicle subsystems such as vehicle stability, vision-based systems for detecting vehicles and pedestrians on the road, etc. Vehicle stability systems, in particular, can directly benefit from forward geometry information. Vision-based systems could benefit greatly by using this information to focus on only the area in the cameras field-of-view that corresponds to the forward path of the host-vehicle, thereby enhancing target identification and reducing the spurious signal reporting rate.

Information about road geometry in the forward path of an automobile can be obtained by using an onboard vision system or by using a GPS/MAP system, or by detecting electromagnetic radiation emitting beacons along the roadside, which are configured to provide data that can be correlated to a map database, or any of a plurality of other systems. The sensor system detects and identifies lane markers on the road and fits them to a polynomial road model. The actual vision system could be responsive to electromagnetic radiation in any number of forms, such as a camera responsive to radiation in the infrared region, the visible region, or both. The GPS/MAP system combines information about host vehicle position using a satellite based locating system such as the global positioning system (GPS) with a road map database. The system uses GPS data, to place the vehicle on the correct road and then extracts forward road information about this road from the MAP database. Both these methods provide noisy information about forward road geometry and do not generally find application as an exclusive means for forward road geometry prediction. It is assumed that the host vehicle is equipped with at least one of the above sensor systems, or an equivalent system, for providing forward road geometry information. Furthermore, the collected road geometry data is in the form of noisy offsets of a number of road points starting at, and extending up to, a finite distance (referred to as the look-ahead view of the sensor system) in front of the host vehicle. The invention uses the noisy information provided by the sensors to estimate forward geometry more accurately and with much finer sampling.

A useful model, finding application in the identification of the horizontal course of a road is a clothoid, which is a curve whose curvature changes linearly with distance along the road. Starting with curvature $c_0$, curvature at distance x along the curve is given by:

$$c(x) = c_0 + c_1 x. \qquad \text{Eqn. (1)}$$

The coefficient $c_0$ and $c_1$ (rate of change of curvature with distance) are called the clothoid coefficients. Typical highway geometries are approximated by a set of successive clothoids with different coefficients. For example, two segments of constant curvature ($c_1=0$) could be joined by a transition section where curvature changes linearly with distance ($c_1$ not equal 0). Thus, transition between segments can have jumps in the clothoid coefficient $c_1$, even when the curvature $c(x)$ itself is steady across the segment transition. A clothoid can be approximated by a third order polynomial that relates the lateral offset of the curve with longitudinal distance along it (when the change in road heading angle over the distance along the curve is small). Denoting x as longitudinal distance, and y as lateral offset (within a segment), then under small angle approximations:

$$y \approx \frac{c_0 x^2}{2} + \frac{c_1 x^3}{6}. \qquad \text{Eqn. (2)}$$

Since the road geometry changes as the host vehicle moves along the road, the clothoid coefficients are time-varying and dependent on the speed of the vehicle. One approach to estimating model parameters at each time instant is to perform non-recursive least-squares fitting on the data points (offset value of road points). The main problem with non-recursive least-squares estimation is that it can be very sensitive to stochastic errors (e.g., sensor noise) resulting in oscillating estimates from one time step to the next. One possible solution is to use a recursive estimation method. However, since vehicle motion along the road makes forward road geometry a quantity that varies dynamically, a recursive least-squares method cannot be used with adequate results; rather a dynamic recursive estimation approach (Kalman filter) is utilized. Kalman filters perform recursive estimation using both a model-based update of state variables (clothoid coefficients) and an update of the state estimates using a weighted version of the new measurements. Recursive filtering can provide more accuracy and improved robustness to stochastic errors (e.g., measurement noise)—in part because the Kalman filter acts as a sort of "low-pass" filter.

One aspect of the present invention includes a novel road model where the forward lane geometry is divided into two regions or segments with different $c_1$ parameters: one from $0-d_1$ in front of the host vehicle (near-range segment) and the second from $d_1-d_2$ in front of the host vehicle (far-range segment). Nominal values for $d_1$ and $d_2$ are 50 m and 100 m, respectively. The curvature is assumed to be continuous at the transition between the two segments. Instead of estimating the transition point, it is assumed that the transition point is at a fixed distance, $d_1$, in front of the host vehicle. This approach provides better results than those obtained while using a single clothoid road model and solves the shortcomings encountered with the use of a multi-clothoid model based on the detection of transition points. Certain components of this aspect are described in the U.S. patent application Ser. No. 09/994,515 which is hereby incorporated by reference for all purposes.

Figure 3:
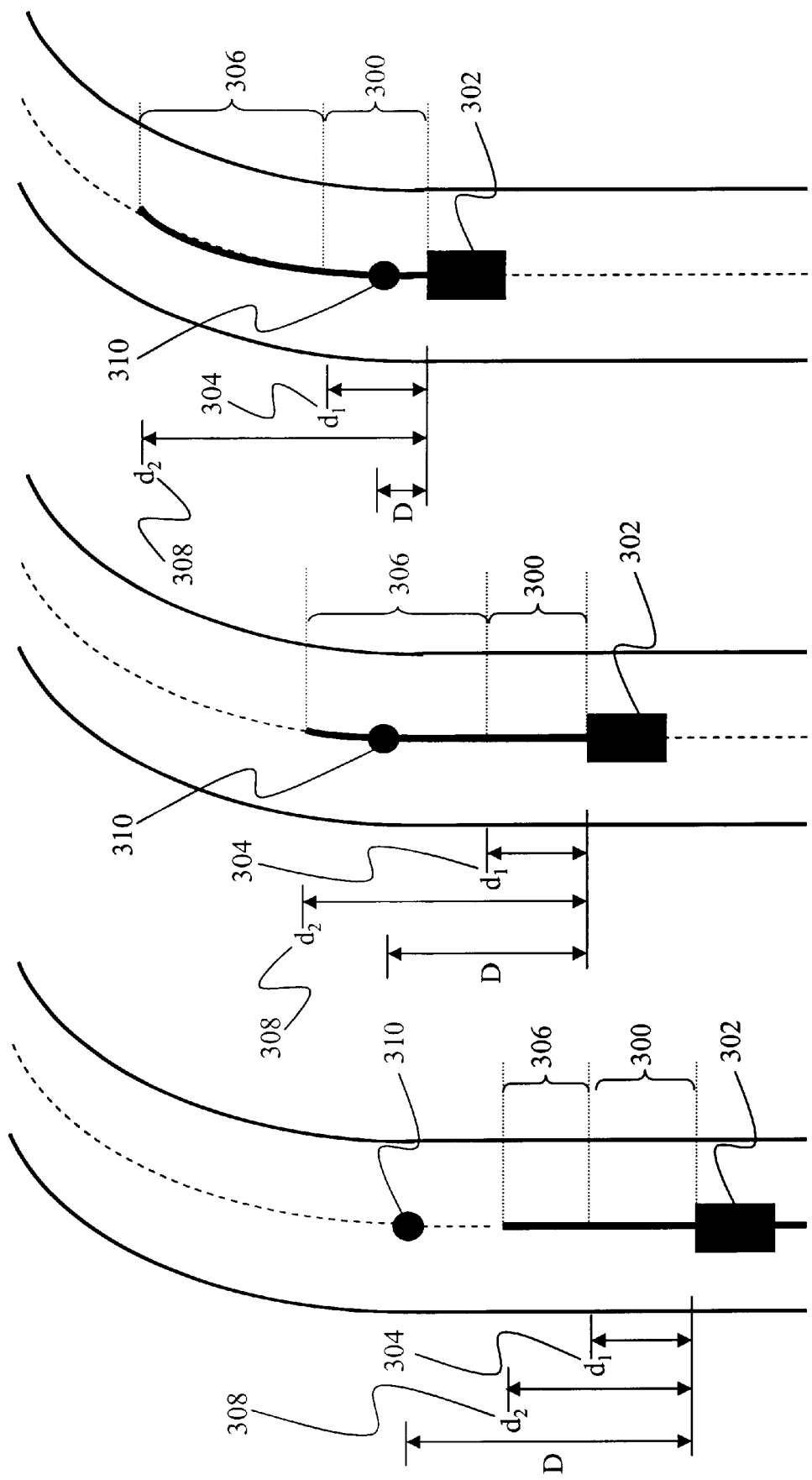
FIGS. 3(a), 3(b), and 3(c) are diagrams of three different road models used in the adaptive Kalman filter scheme according to the present invention.

Referring now to FIG. 3, which presents a two-clothoid road model the near-range segment 300 extends from the host vehicle 302 up to distance $d_1$ 304. The far-range segment 306 extends from $d_1$ 304 up to $d_2$ 308 in front of the host vehicle 302. The curvature of the road at the host vehicle is $c_0$, and the rate of change of curvature in the near and far range segments 300 and 306 are $c_1$ and $c_2$, respectively. For small angle approximations, the lateral offset y of road edge as a function of look-ahead distance x is given by:

$$y = c_0 \frac{x^2}{2} + c_1 \frac{x^3}{6}, \ 0 < x \le d_1 \qquad \text{Eqn. 3}$$

$$y = c_0 \frac{x^2}{2} + c_1 \left( \frac{d_1^3}{6} + \frac{x(x-d_1)d_1}{2} \right) + c_2 \frac{(x-d_1)^3}{6},$$

$$d_1 < x \le d_2,$$

the Kalman filter formulation for two-clothoid road model. The two-clothoid road model using a Kalman filter produces better results than have been obtained using conventional approaches. According to the two-clothoid process dynamics model, as the vehicle 302 drives through the clothoid with speed v, the coefficients describing the curvature model of the clothoid change according to the motion of the vehicle 302. For a road with jumps in curvature rate in the look-ahead range, the time-derivative of this rate of change, at the transition, is an impulse. However, since these transitions cannot be reliably determined using the existing noisy measurements, the time derivative of $c_1$ and $c_2$ is approximated by white noise. This leads to the following dynamic model of the road in the horizontal plane:

$$\begin{bmatrix} \dot{c}_0 \\ \dot{c}_1 \\ \dot{c}_2 \end{bmatrix} = \begin{bmatrix} 0 & v(t) & 0 \\ 0 & 0 & 0 \\ 0 & 0 & 0 \end{bmatrix} \begin{bmatrix} c_0 \\ c_1 \\ c_2 \end{bmatrix} + \begin{bmatrix} 0 \\ w_1(t) \\ w_2(t) \end{bmatrix}, \qquad \text{Eqn. 4}$$

where, v(t) is vehicle speed;

$w_1(t)$ is the continuous driving white noise term for $c_1$; and $w_2(t)$ is the continuous driving white noise term for $c_2$.

The vertical curvature in the above model has been ignored, but can be easily appended to the above state-space representation. Consider a sample time interval T, the predicted state vector estimate at time k+1 using the estimate at time k is given by:

$$X_{k+1} = \Phi_k X_k + W_k;  \quad \text{Eqn. 5}$$

$$X_k = \text{state vector} = \begin{bmatrix} c_{0,k+1} \\ c_{1,k+1} \\ c_{2,k+1} \end{bmatrix} \quad \text{Eqn. 6}$$

$$\Phi_k = \text{State transition matrix} = \begin{bmatrix} 1 & v(k)T & 0 \\ 0 & 1 & 0 \\ 0 & 0 & 1 \end{bmatrix} \quad \text{Eqn. 7}$$

$$W_k = \text{Process noise vector} = \begin{bmatrix} v(k)Tw_1(k) \\ w_1(k) \\ w_2(k) \end{bmatrix} \quad \text{Eqn. 8}$$

where $w_1(k)$ and $w_2(k)$ are scalar, zero-mean, white-noise sequences with variances $\sigma_1^2$ and $\sigma_2^2$, respectively.

The process noise covariance $Q(k)$ is thus defined as:

$$Q(k) = \begin{bmatrix} (v(k)T)^2 \sigma_1^2 & v(k)T\sigma_1^2 & 0 \\ v(k)T\sigma_1 & \sigma_1^2 & 0 \\ 0 & 0 & \sigma_2^2 \end{bmatrix}. \quad \text{Eqn. 9}$$

The measurement vector $Y_k$ is comprised of noisy lateral offsets of a number of road points available from some sensor system onboard the host vehicle (vision, GPS, etc.). Let us assume that measurements are available for N road points: n points with lateral offsets $y_1, y_2, \ldots, y_n$ at distances $x_1, x_2, \ldots, x_n$, respectively, in the near-range segment, and f points with lateral offsets $y_{n+1}, y_{n+2}, \ldots, y_{n+f}$ at distances $X_{n+1}, X_{n+2}, \ldots, x_{n+f}$, respectively, in the far-range segment (N=n+f). Using Equation (3), we can denote the measurement equation in a matrix notation:

$$Y_k = H_k X_k + N_k, \quad \text{Eqn. 10}$$

The estimation approach set forth above, uses the above process and measurement model equations to recursively estimate the road model parameters. In this example a Kalman filter is used.

One aspect of the present invention provides an adaptive Kalman filter protocol wherein a bank of Kalman filters dynamically provide estimates of road geometry. The invention dynamically selects the Kalman filter, from the filter bank, which is best suited to existing road conditions. A Kalman filtering protocol not utilizing the bank of Kalman filters has a simple Kalman filter with parameters $\sigma_1^2$ and $\sigma_2^2$ of the process noise covariance matrix Q, which are assigned a fixed value. Typical value of $\sigma_1^2$ for the single-clothoid road model, as might be found in an existing system is on the order of $5e^{-6}$. This value is selected to provide a compromise between noise in the estimated geometry and filter delay. The Kalman filter then uses the process and measurement model equations described above to recursively estimate the road model parameters, which is a sequence of time and measurement update steps as set forth in TABLE 1. The estimated state vector after each measurement update by this Kalman filter best describes the upcoming road geometry.

TABLE 1

| Time update step | State vector | $\hat{X}_k(-) = \phi_{k-1}\hat{X}_{k-1}(+)$ |
|---|---|---|
| | Error covariance | $\hat{P}_k(-) = \phi_{k-1}P_{k-1}(+)\phi_{k-1}^T + Q_{k-1}$ |
| Measurement update step | State vector | $\hat{X}_k(+) = \hat{X}_k(-) + K_k[Z_k - H_k\hat{X}_k(-)]$ |
| | Error covariance | $\hat{P}_k(+) = [I - K_kH_k]P_k(-)$ |
| | Kalman gain | $K_k = P_k(-)H_k^T[H_kP_k(-)H_k^T + R_k]^{-1}$ |

As the vehicle approaches a transition point (change in road geometry), the variances of $c_1$ and $c_2$ should ideally be increased to better track the rapidly changing geometry. When the geometry in the sensor range $(0-d_2)$ is constant, then variances of $c_1$ and $c_2$ should be lowered to reduce the noise in the estimated results. Thus, improved estimation accuracy will be obtained by varying the values of $\sigma_1^2$ and $\sigma_2^2$ adaptively depending on the type of upcoming road geometry (constant or varying).

Figure 4:
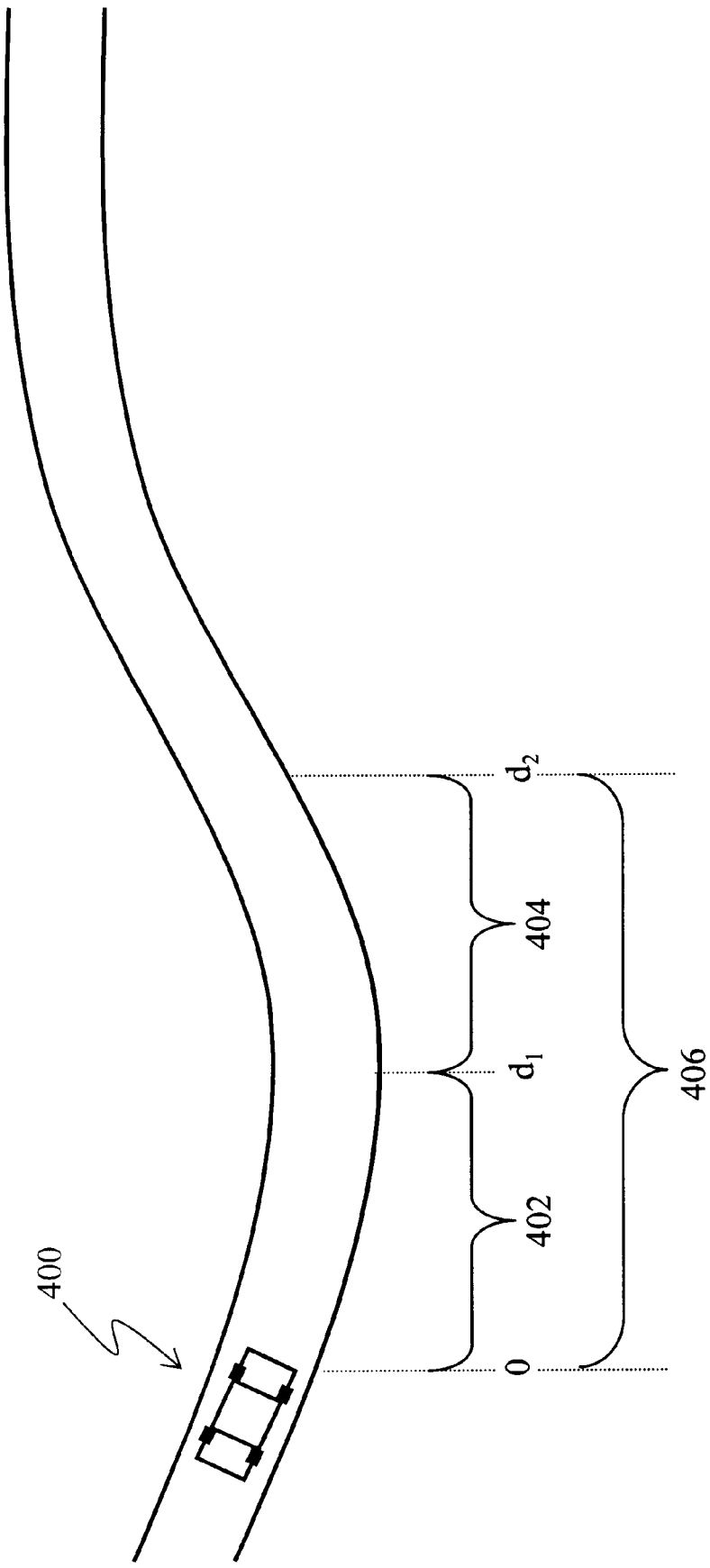
FIG. 4 is an illustrative depiction of a host vehicle and a curved road portion ahead of the vehicle.

Typical roadways are laid as either (1) constant geometry clothoid segments with curvature continuity across the transition between these segments or (2) constant geometry $$Y_k = \text{Measurement vector} = \begin{bmatrix} y_1 \\ y_2 \\ \vdots \\ y_N \end{bmatrix}, \quad \text{Eqn. 11}$$

$$H_k = \text{Measurement transfer function} = \begin{bmatrix} \frac{1}{2}x_1^2 & \frac{1}{6}x_1^3 & 0 \\ \frac{1}{2}x_2^2 & \frac{1}{6}x_2^3 & 0 \\ \vdots & \vdots & \vdots \\ \frac{1}{2}x_n^2 & \frac{1}{6}x_n^3 & 0 \\ \frac{1}{2}x_{n+1}^2 & \frac{1}{6}d_1^3 + \frac{1}{2}(x_{n+1}-d_1)(x_{n+1})d_1 & \frac{1}{6}(x_{n+1}-d_1)^3 \\ \frac{1}{2}x_{n+1}^2 & \frac{1}{6}d_1^3 + \frac{1}{2}(x_{n+2}-d_1)(x_{n+2})d_1 & \frac{1}{6}(x_{n+2}-d_1)^3 \\ \frac{1}{2}x_{n+f}^2 & \frac{1}{6}d_1^3 + \frac{1}{2}(x_{n+f}-d_1)(x_{n+f})d_1 & \frac{1}{6}(x_{n+f}-d_1)^3 \end{bmatrix} \quad \text{Eqn. 12}$$

$$N_k = \text{Measurement noise vector} = \begin{bmatrix} n_1 \\ n_2 \\ \vdots \\ n_N \end{bmatrix}, \quad \text{Eqn. 13}$$

segments (straight or circular) with abrupt curvature discontinuity at the transition between these segments. As used herein, the letter "D" shall denote the distance to the nearest transition point in front of the host vehicle. As depicted in FIG. 4, the near-range path in front of the host vehicle 400 is 0–$d_1$ 402 and far-range path in front of the host vehicle is $d_1$–$d_2$ 404. Under the assumption that all constant geometry segment lengths are >$d_2$ 406, upcoming road geometry on virtually any roadway can be described by one of the following three road models:

Model 1: Constant Geometry Road Section (D>d2)

Referring again to FIG. 3(a), the transition point 310 is beyond the sensor look-ahead range 308. There is no change in geometry within the sensor look-ahead range, i.e., D>d2. In this scenario, both $c_1$ and $c_2$ are constant and the process noise should be set to very low values. Stated alternatively the Kalman filter parameters $\sigma_1^2$ and $\sigma_2^2$ of the noise covariance matrix, Q, should both be set to values that are at or below the values provided in the situation where d1<D<d2 or where D<d1.

Model 2: Upcoming Transition in Far-Range (d1<D<d2)

When a host vehicle is close enough to a transition point 310, as depicted in FIG. 3(b), such that the transition point 310 is within the far-range 308, then the far-range coefficient $c_2$ will change rapidly while near-range coefficient $c_1$ remains constant. In such a situation the $\sigma_1^2$ value is relatively low, and the $\sigma_2^2$ is relatively high.

Model 3: Upcoming Transition in Near-Range (D<d1)

In the third model, depicted in FIG. 3(c), as the vehicle approaches the transition point 310, the transition point 310 will eventually enter the near-range region 300 of the vehicle. Thus, this model always follows model 2. During upcoming transitions in road geometry in the near-range (distance to transition point D<$d_1$), near-range coefficient $c_1$ will change rapidly while far-range coefficient $c_2$ has already adapted to the new range geometry and so is constant. In this situation, $\sigma_1^2$ is relatively high and $\sigma_2^2$ is relatively low.

Figure 5:
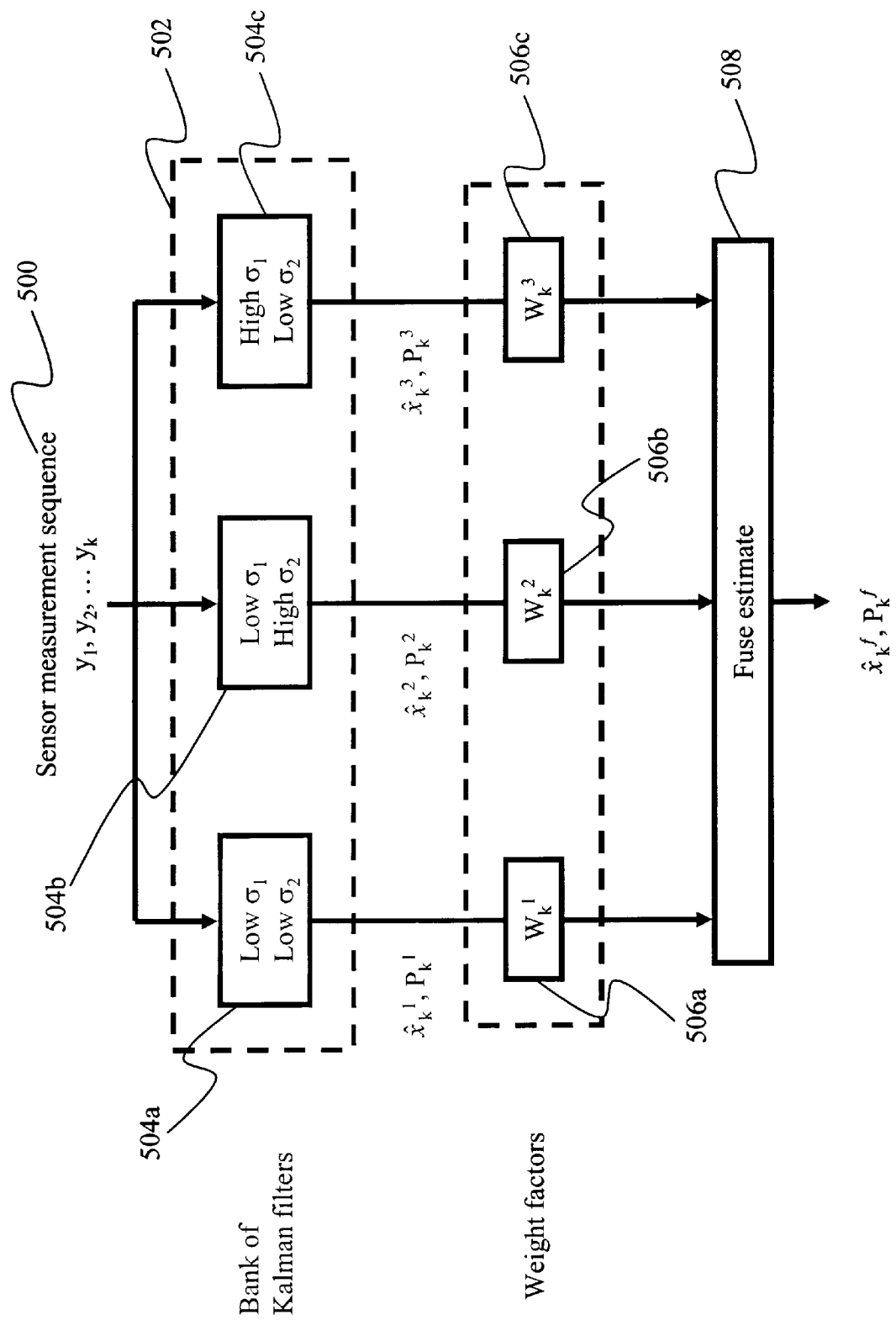
FIG. 5 is a block diagram showing the adaptive Kalman filter system of the present invention, implementing three parallel Kalman filters.

If the upcoming road geometry model was known a priori to be model 1, 2, or 3, then the process noise covariance matrix Q parameters $\sigma_1^2$ and $\sigma_2^2$ could be set accordingly, resulting in good filter performance. However, the upcoming road geometry model is generally not known a priori. According to the present invention, the upcoming road geometry is modeled as a discrete random variable with a finite number of possible realizations (in this example either model 1, 2 or 3). The adaptive Kalman filter protocol accordingly implements 3 parallel Kalman filters (one for each model) operating on the same measurement sequence simultaneously as shown in FIG. 5. A sensor measurement sequence $y_1, y_2 \ldots y_k$ (element 500) is provided to a bank of Kalman filters 502, all of which are identical (same ($\phi$, H, R), except for the road model used in each. According to this aspect there are three road models.

Each Kalman filter uses the process and measurement model equations to recursively estimate the road model parameters using the Kalman filter, which is a sequence of time and measurement update steps (see TABLE 1). The outputs of each Kalman filter after the measurement update step, utilizing the latest available measurement vector $Y_k$ at time k, are the estimated state vector $x_k$ and error covariance matrix $P_k$. In FIG. 5, the outputs of filters 504a, 504b, and 504c have been denoted as j (using road model j, where j=1,2 or 3) as $x_k^j$ and $P_k^j$. The weight factors $W_k^j$ 506a, 506b, and 506c for each filter are next calculated using the outputs of each filter 504a, 504b, and 504c. The weight factor of each filter is the probability that the upcoming road geometry matches the road model hypothesized in the filter. Stated alternatively, the weight factor for the filter with the correct hypothesis (correct road model) approaches unity. After being assigned a weighted value, the weighted road models are fused in a fusion element 508, and a weighted output road geometry model is provided. One of the main objectives of the adaptive filter scheme is to optimally estimate the state vector $x_k$ based on the filter weight factors (or probability of each model). In this aspect, the fused state and covariance matrix estimates are simply a weighted combination of the individual filter estimates, where each estimate is weighted according to its filter weight. Since the weight factors are updated after each measurement step, the filter adapts to the changing road geometry and is self-learning in that respect.

Calculation of weight factors: As mentioned before, the weight factors are the α posteriori probabilities of the corresponding road model being correct. Three process (road) models have been postulated and a Kalman filter is set up for each. The present invention contemplates that additional road models could be postulated and corresponding Kalman filters could be added to the filter bank. Based on the road model likelihood functions, the probability of each road model being correct needs to be calculated. Detailed derivation of α posteriori probabilities for a general adaptive Kalman filter scheme can be found in the literature. The present invention gives the basic equations as applicable to the proposed invention. The measurement sequence up to current time k is, herein defined as, $E_k = \{Y_1, Y_2, \ldots Y_k\}$. Letting $M_j$ be the event that model j is correct with prior probability $P\{M_j\} = W_0^j$, where 0 denotes starting time index time and j denotes filter number (j=1, 2, or 3). The likelihood of the measurements up to time k under the assumption of model j is:

$$\lambda_k^j = p(E_k / M_j) = \prod_{i=1}^{k} p[v_i^j].$$

Here $v_i^j$ is a part of the innovation from filter j at time i. Under the Gaussian assumption, the probability density function (PDF) of the innovation is:

$$p[v_i^j] = det(2\pi S_i^j)^{-\frac{1}{2}} \exp(-\frac{1}{2} v_i^{j'}(S_i^j)^{-1} v_i^j),$$

where $S_i^j = HP_i^j (-) H^T + R$.

H is the measurement transfer function as described above, P(−) is the extrapolated error covariance matrix (see TABLE 1) and S is the measurement prediction covariance matrix. Using Bayes' rule, the weight factor or posterior probability that model j is correct at time k is:

$$W_k^j = P(M_j / E_k) = \frac{\lambda_k^j W_0^j}{\sum_{l=1}^{3} \lambda_k^l W_0^l}.$$

The above derivation is exact under the following assumptions:

A. The correct model is among the set of road models considered.

B. The same model has been in effect from the initial time.

Assumption A requires that the three road models chosen here exhaustively describe any road geometry (assuming each segment length is >$d_2$, which is a reasonable assumption). Even though the choice of process noise is done in an ad-hoc manner and may not match the true variance of the transition or of the constant geometry segment, one of the models still "best" describes the upcoming road geometry amongst all three models (i.e., has the highest weight factor). While estimation errors with this "best" road model will be larger than the "optimal" model (where exact variances were known somehow), the errors will be smaller than the conventional Kalman filter approach. Assumption B is not true as road geometry is constantly changing. This violation can be addressed by sliding-window approach, where the likelihood function is calculated using a finite-sequence of innovations. In this aspect, an ad-hoc approach of choosing L immediately previous innovations is used (where L is the length of the sliding-window). Thus the likelihood of measurements up to time k under assumption of model j becomes:

$$\lambda_k^j = p(E_k / M_j) = \prod_{i=k-l-1}^{k} p[v_i^j].$$

Fused state vector and error covariance estimates are then obtained using:

$$\hat{x}_k^{fused} = \sum_{j=1}^{3} W_k^j \hat{x}_k^j \text{ and}$$

$$P_k^{fused} = \sum_{j=1}^{3} W_k^j P_k^j.$$

The fused estimate $\hat{x}_k^{fused}$ is used as the best description of upcoming road geometry (in forward range $0$–$d_2$).

Physical Embodiments of the Present Invention

The present invention has three principal "physical" embodiments. The first is an apparatus for dynamically predicting road geometry, typically in the form of a computer system operating software of in the form of a "hard-coded" instruction set. The second physical embodiment is a method, typically in the form of software, operated using a data processing system (computer). The third principal physical embodiment is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks and flash-type memories. These embodiments will be described in more detail below.

Figure 6:
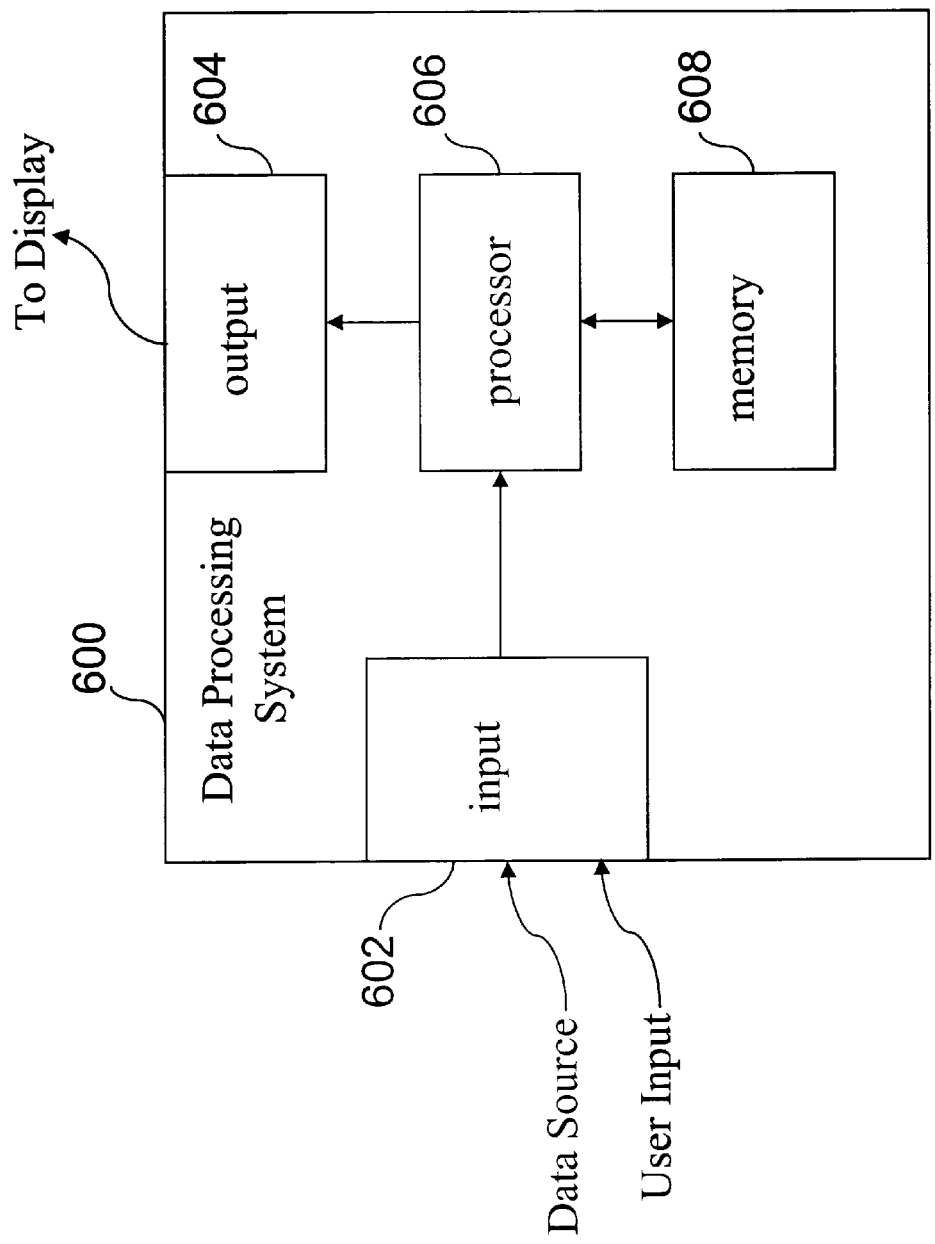
FIG. 6 is a block diagram depicting the components of a computer system used in the present invention.

A block diagram depicting the components of a computer system used in the present invention is provided in FIG. 6. The data processing system 600 comprises an input 602 for receiving sensor data relevant to predicting road geometry. Note that the input 602 may include multiple "ports" for receiving data as well as user input. The output 604 is connected with the processor for providing output. Output may be provided directly to the user through a display or may be provided to other devices or other programs for use therein. The input 602 and the output 604 are both coupled with a processor 606, which may be a general-purpose computer processor or a specialized processor designed specifically for use with the present invention. The processor 606 is coupled with a memory 608 to permit storage of data and software to be manipulated by commands to the processor.

Figure 7:
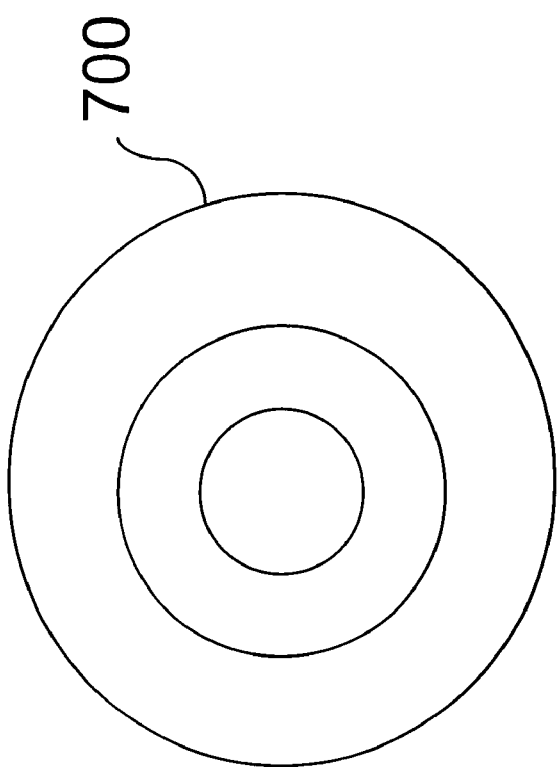
FIG. 7 is an illustrative diagram of a computer program product embodying the present invention.

An illustrative diagram of a computer program product embodying the present invention is depicted in FIG. 7. The computer program product 700 is depicted as an optical disk such as a CD or DVD. However, as mentioned previously, the computer program product generally represents computer readable code stored on any compatible computer readable medium.

What is claimed is:

1. An apparatus for dynamically predicting road geometry comprising:

i. a bank of filters configured to receive current environmental data from at least one sensor and to perform an estimation using the current environmental data, and to provide a filter output from each filter;

ii. a weighting element configured to receive the filter output from the bank of filters and to ascribe a weighted value to each filter output based on a relevance of the filter, thereby providing weighted outputs;

iii. a fusing element configured to fuse the weighted outputs into a single output; whereby the output describes a vehicle forward path estimate.

2. An apparatus for dynamically predicting road geometry as set forth in claim 1, wherein the bank of filters is further configured to receive a previous vehicle path estimate and to recursively perform the estimation based on the current environmental data and the previous vehicle path estimate.

3. An apparatus for dynamically predicting road geometry as set forth in claim 2, wherein each filter in the bank of filters is a Kalman filter.

4. An apparatus for dynamically predicting road geometry as set forth in claim 3, wherein the bank of filters includes three Kalman filters.

5. An apparatus for dynamically predicting road geometry as set forth in claim 4, wherein the configuration of the bank of filters is based on a polynomial road model.

6. An apparatus for dynamically predicting road geometry as set forth in claim 5, wherein the polynomial road model is a two-clothoid road model.

7. An apparatus for dynamically predicting road geometry as set forth in claim 6, wherein each filter is tuned to a different class of geometry within the two-clothoid road model.

8. An apparatus for dynamically predicting road geometry as set forth in claim 7, wherein the different classes of geometry include a constant geometry road section, an upcoming transition in the far range, and an upcoming transition in the near range.

9. An apparatus for dynamically predicting road geometry as set forth in claim 8, wherein the weighting element ascribes weighted values based on the posterior probabilities of a fit between the filter and the forward vehicle path estimate.

10. An apparatus for dynamically predicting road geometry as set forth in claim 9, wherein the at least one sensor is a device selected from a group consisting of imaging devices, GPS/map systems, laser sensors, and radars.

11. An apparatus for dynamically predicting road geometry as set forth in claim 10, wherein the output of the apparatus is configured for use by other automotive systems selected from a group consisting of driver assistance systems and vehicle safety systems.

12. An apparatus for dynamically predicting road geometry as set forth in claim 1 wherein each filter in the bank of filters is a Kalman filter.

13. An apparatus for dynamically predicting road geometry as set forth in claim 1, wherein the configuration of the bank of filters is based on a polynomial road model.

14. An apparatus for dynamically predicting road geometry as set forth in claim 13, wherein the polynomial road model is a two-clothoid road model.

15. An apparatus for dynamically predicting road geometry as set forth in claim 1, wherein each filter is tuned to a different class of geometry within the two-clothoid road model.

16. An apparatus for dynamically predicting road geometry as set forth in claim 15, wherein the different classes of geometry include a constant geometry road section, an upcoming transition in the far range, and an upcoming transition in the near range.

17. An apparatus for dynamically predicting road geometry as set forth in claim 1, wherein the weighting element ascribes weighted values based on the posterior probabilities of a fit between the filter and the forward vehicle path estimate.

18. An apparatus for dynamically predicting road geometry as set forth in claim 1, wherein the at least one sensor is a device selected from a group consisting of imaging devices, GPS/map systems, laser sensors, and radars.

19. An apparatus for dynamically predicting road geometry as set forth in claim 1, wherein the output of the apparatus is configured for use by other automotive systems selected from a group consisting of driver assistance systems and vehicle safety systems.

20. A computer program product for dynamically predicting road geometry, the computer program product comprising means, stored on computer readable medium, for:
   i. filtering current environmental data from at least one sensor and performing an estimation using the current environmental data, and outputting a filter output from each filter;
   ii. weighing the filter output from the bank of filters and ascribing a weighted value to each filter output based on a relevance of the filter, thereby providing weighted outputs;
   iii. fusing the weighted outputs into a single output; whereby the output describes a vehicle forward path estimate.

21. A computer program product for dynamically predicting road geometry as set forth in claim 20, wherein means for filtering is further configured to receive a previous vehicle path estimate and to recursively perform the estimation based on the current environmental data and the previous vehicle path estimate.

22. A computer program product for dynamically predicting road geometry as set forth in claim 21, wherein filters used in the filtering step include a bank of Kalman filters.

23. A computer program product for dynamically predicting road geometry as set forth in claim 22, wherein the bank of filters includes three Kalman filters.

24. A computer program product for dynamically predicting road geometry as set forth in claim 23, wherein the bank of filters is configured based on a polynomial road model.

25. A computer program product for dynamically predicting road geometry as set forth in claim 24, wherein the polynomial road model is a two-clothoid road model.

26. A computer program product for dynamically predicting road geometry as set forth in claim 25, wherein each filter in the bank of filters is tuned to a different class of geometry within the two-clothoid road model.

27. A computer program product for dynamically predicting road geometry as set forth in claim 26, wherein the different classes of geometry include a constant geometry road section, an upcoming transition in the far range, and an upcoming transition in the near range.

28. A computer program product for dynamically predicting road geometry as set forth in claim 27, wherein the means for weighing ascribes weighted values based on the posterior probabilities of a fit between the filter and the forward vehicle path estimate.

29. A computer program product for dynamically predicting road geometry as set forth in claim 28, wherein the environmental data is received from at least one sensor is a device selected from a group consisting of imaging devices, GPS/map systems, laser sensors, and radars.

30. A computer program product for dynamically predicting road geometry as set forth in claim 29, wherein the output is configured for use by automotive systems selected from a group consisting of driver assistance systems and vehicle safety systems.

31. A computer program product for dynamically predicting road geometry as set forth in claim 20 wherein filters used in the filtering step include a bank of Kalman filters.

32. A computer program product for dynamically predicting road geometry as set forth in claim 20, wherein the configuration of the bank of filters is based on a polynomial road model.

33. A computer program product for dynamically predicting road geometry as set forth in claim 32, wherein the polynomial road model is a two-clothoid road model.

34. A computer program product for dynamically predicting road geometry as set forth in claim 20, wherein each filter is tuned to a different class of geometry within the two-clothoid road model.

35. A computer program product for dynamically predicting road geometry as set forth in claim 34, wherein the different classes of geometry include a constant geometry road section, an upcoming transition in the far range, and an upcoming transition in the near range.

36. A computer program product for dynamically predicting road geometry as set forth in claim 20, wherein the means for weighing ascribes weighted values based on the posterior probabilities of a fit between the filter and the forward vehicle path estimate.

37. A computer program product for dynamically predicting road geometry as set forth in claim 20, wherein the environmental data is received from at least one sensor is a device selected from a group consisting of imaging devices, GPS/map systems, laser sensors, and radars.

38. A computer program product for dynamically predicting road geometry as set forth in claim 20, wherein the output is configured for use by automotive systems selected from a group consisting of driver assistance systems and vehicle safety systems.

39. A method for dynamically predicting road geometry, the method comprising steps of:
   i. filtering current environmental data from at least one sensor and performing an estimation using the current environmental data, and outputting a filter output from each filter;
   ii. weighing the filter output from the bank of filters and ascribing a weighted value to each filter output based on a relevance of the filter, thereby providing weighted outputs;
   iii. fusing the weighted outputs into a single output; whereby the output describes a vehicle forward path estimate.

40. A method for dynamically predicting road geometry as set forth in claim 39, wherein step of filtering is tailored to receive a previous vehicle path estimate and to recursively perform the estimation based on the current environmental data and the previous vehicle path estimate.

41. A method for dynamically predicting road geometry as set forth in claim 40, wherein filters used in the filtering step include a bank of Kalman filters.

42. A method for dynamically predicting road geometry as set forth in claim 41, wherein the bank of filters includes three Kalman filters.

43. A method for dynamically predicting road geometry as set forth in claim 42, wherein the bank of filters is configured based on a polynomial road model.

44. A method for dynamically predicting road geometry as set forth in claim 43, wherein the polynomial road model is a two-clothoid road model.

45. A method for dynamically predicting road geometry as set forth in claim 44, wherein each filter in the bank of filters is tuned to a different class of geometry within the two-clothoid road model.

46. A method for dynamically predicting road geometry as set forth in claim 45, wherein the different classes of geometry include a constant geometry road section, an upcoming transition in the far range, and an upcoming transition in the near range.

47. A method for dynamically predicting road geometry as set forth in claim 46, wherein the step of weighing ascribes weighted values based on the posterior probabilities of a fit between the filter and the forward vehicle path estimate.

48. A method for dynamically predicting road geometry as set forth in claim 47, wherein the environmental data is received from at least one sensor is a device selected from a group consisting of imaging devices, GPS/map systems, laser sensors, and radars.

49. A method for dynamically predicting road geometry as set forth in claim 48, wherein the output is configured for use by automotive systems selected from a group consisting of driver assistance systems and vehicle safety systems.

50. A method for dynamically predicting road geometry as set forth in claim 39 wherein filters used in the filtering step include a bank of Kalman filters.

51. A method for dynamically predicting road geometry as set forth in claim 39, wherein the configuration of the bank of filters is based on a polynomial road model.

52. A method for dynamically predicting road geometry as set forth in claim 51, wherein the polynomial road model is a two-clothoid road model.

53. A method for dynamically predicting road geometry as set forth in claim 39, wherein each filter is tuned to a different class of geometry within the two-clothoid road model.

54. A method for dynamically predicting road geometry as set forth in claim 53, wherein the different classes of geometry include a constant geometry road section, an upcoming transition in the far range, and an upcoming transition in the near range.

55. A method for dynamically predicting road geometry as set forth in claim 39, wherein the step of weighing ascribes weighted values based on the posterior probabilities of a fit between the filter and the forward vehicle path estimate.

56. A method for dynamically predicting road geometry as set forth in claim 39, wherein the environmental data is received from at least one sensor is a device selected from a group consisting of imaging devices, GPS/map systems, laser sensors, and radars.

57. A method for dynamically predicting road geometry as set forth in claim 39, wherein the output is configured for use by automotive systems selected from a group consisting of driver assistance systems and vehicle safety systems.

* * * * *

UNITED STATES PATENT AND TRADEMARK OFFICE
CERTIFICATE OF CORRECTION

PATENT NO. : 6,718,259 B1  Page 1 of 1
APPLICATION NO. : 10/263924
DATED : April 6, 2004
INVENTOR(S) : Deepak Khosla It is certified that error appears in the above-identified patent and that said Letters Patent is hereby corrected as shown below:

In the specification, at column 10, line 11 AND at column 10, line 19:
"α posteriori"
should read:
--a posteriori--

Signed and Sealed this

Twenty-fifth Day of March, 2008

JON W. DUDAS
*Director of the United States Patent and Trademark Office*